United States Patent
Lashina et al.

(10) Patent No.: US 9,622,330 B2
(45) Date of Patent: Apr. 11, 2017

(54) LIGHTING CONTROL VIA A MOBILE COMPUTING DEVICE

(71) Applicant: PHILIPS LIGHTING HOLDING B.V., Eindhoven (NL)

(72) Inventors: Tatiana Aleksandrovna Lashina, Eindhoven (NL); Bartel Marinus Van De Sluis, Eindhoven (NL); Philip Steven Newton, Waalre (NL); Dzmitry Viktorovich Aliakseyeu, Eindhoven (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/912,221

(22) PCT Filed: Aug. 13, 2014

(86) PCT No.: PCT/IB2014/063893
§ 371 (c)(1),
(2) Date: Feb. 16, 2016

(87) PCT Pub. No.: WO2015/022650
PCT Pub. Date: Feb. 19, 2015

(65) Prior Publication Data
US 2016/0205748 A1    Jul. 14, 2016

Related U.S. Application Data

(60) Provisional application No. 61/866,735, filed on Aug. 16, 2013.

(51) Int. Cl.
*H05B 37/02*    (2006.01)
*G06F 1/16*    (2006.01)
(Continued)

(52) U.S. Cl.
CPC ....... *H05B 37/0272* (2013.01); *G06F 1/1643* (2013.01); *G06F 1/1694* (2013.01);
(Continued)

(58) Field of Classification Search
CPC ............ H05B 37/0227; H05B 37/0245; H05B 33/0863; H05B 37/0218; H05B 37/0272;
(Continued)

(56) References Cited

U.S. PATENT DOCUMENTS

| 6,563,430 B1 | 5/2003 | Kemink et al. |
| 8,248,467 B1 | 8/2012 | Ganick et al. |

(Continued)

FOREIGN PATENT DOCUMENTS

| KR | 20120126821 A | 11/2012 |
| WO | 2010122440 A2 | 10/2010 |

(Continued)

*Primary Examiner* — Vibol Tan
(74) *Attorney, Agent, or Firm* — Meenakshy Chakravorty

(57) ABSTRACT

Systems, methods, apparatus (e.g., mobile computing devices), and computer-readable media are described herein for lighting control. In various embodiments, a mobile computing device may receive input indicative of a desired lighting property adjustment for a lighting effect sensed by a light sensor of the mobile computing device. The mobile computing device may identify one or more LED-based lighting units that contribute to the sensed lighting effect. The mobile computing device may then generate, for wireless transmission to the one or more contributing LED-based lighting units, an instruction configured to cause at least some of the one or more contributing LED-based lighting units to implement the desired lighting property adjustment. In various embodiments, one or more user inputs of the mobile computing device may be selectively enabled, based on a detected lighting context, to receive the input indicative of a desired lighting property adjustment.

18 Claims, 4 Drawing Sheets

(51) Int. Cl.
*H05B 33/08* (2006.01)
*G06F 3/0488* (2013.01)
*G06F 3/0484* (2013.01)
*G08C 17/02* (2006.01)

(52) U.S. Cl.
CPC .......... *G06F 1/1698* (2013.01); *G06F 3/0488* (2013.01); *G06F 3/04847* (2013.01); *G08C 17/02* (2013.01); *H05B 33/0851* (2013.01); *H05B 37/029* (2013.01); *H05B 37/0227* (2013.01); *G06F 2200/1636* (2013.01); *G06F 2200/1637* (2013.01); *G08C 2201/30* (2013.01); *G08C 2201/93* (2013.01)

(58) Field of Classification Search
CPC ............ H05B 33/0854; H05B 33/0845; H05B 33/0869; H05B 33/0872; H05B 37/029; H05B 33/0842; H05B 37/02; H05B 33/0851; H04B 10/116
See application file for complete search history.

(56) References Cited

U.S. PATENT DOCUMENTS

| | | |
|---|---|---|
| 2009/0239587 A1 | 9/2009 | Negron et al. |
| 2012/0184299 A1* | 7/2012 | Loveland ............... G05B 15/02 455/456.3 |
| 2013/0068832 A1 | 3/2013 | Li et al. |
| 2013/0082974 A1 | 4/2013 | Kerr et al. |
| 2014/0028216 A1* | 1/2014 | Wang ................. H05B 37/0245 315/294 |
| 2014/0143034 A1* | 5/2014 | Pi ....................... G06Q 30/0241 705/14.4 |
| 2014/0265870 A1* | 9/2014 | Walma ............... H05B 37/0218 315/151 |

FOREIGN PATENT DOCUMENTS

| | | |
|---|---|---|
| WO | 2011051865 A1 | 5/2011 |
| WO | 2012143814 A1 | 10/2012 |
| WO | 2013085600 A2 | 6/2013 |

\* cited by examiner

LIGHTING CONTROL VIA A MOBILE COMPUTING DEVICE

CROSS-REFERENCE TO PRIOR APPLICATIONS

This application is the U.S. National Phase application under 35 U.S.C. §371 of International Application No. PCT/IB2014/063893, filed on Aug. 13, 2014, which claims the benefit of U.S. Provisional Patent Application No. 61/866,735, filed on Aug. 16, 2013. These applications are hereby incorporated by reference herein.

TECHNICAL FIELD

The present invention is directed generally to lighting control. More particularly, various inventive methods, apparatus, systems and computer-readable media disclosed herein relate to facilitating control of one or more LED-based lighting units using various user inputs of a mobile computing device.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects.

Lighting units, such as LED-based lighting units, may be controlled by mobile computing devices such as smart phones or tablets. For example, a user may operate a graphical user interface (GUI) to select and control various lighting units in a building or room using her smart phone. In some instances, it may be desirable to enable such a user to quickly and easily control only lighting units in the immediate area around her, e.g., those lighting units that actually affect a lighting effect consumed by the user. Requiring the user to operate the GUI to select these local lighting units adds an additional step for the user, who may simply want to create more or less light at her current location quickly and easily.

On a mobile device such as a smart phone or tablet, accessing applications, including lighting control applications, may be cumbersome. The mobile device may first need to be unlocked (in some cases requiring a password) and/or otherwise "awakened." Then, a user may be required to find and open the lighting control application, and may even have to configure the lighting control application manually to be able to control a particular lighting unit. These steps may be more complex and cumbersome than simply locating and adjusting manual lighting controls associated with the lighting units. Some mobile computing devices include, on lock screens, quick launch icons for commonly-used and/or low risk applications. These icons may be actuated (e.g., dragged upwards on a touch screen) to initiate the application without having to unlock the touch screen. However, these icons still require at least some user interaction.

Thus, there is a need in the art to provide systems, methods, apparatus and computer-readable media that make it easier and/or more convenient to implement a lighting property adjustment at lighting units that affect local lighting effect consumed by a user. There is also a need in the art to make it easier and/or more convenient to access user inputs for controlling lighting units.

SUMMARY

The present disclosure is directed to inventive methods, apparatus, systems and computer-readable media for lighting control. More particularly, various inventive computer-readable media (transitory and non-transitory), methods, systems and apparatus for facilitating lighting control of one or more lighting units are provided. For example, in some embodiments, one or more lighting units that contribute to a sensed lighting effect may be identified in response to receipt of input indicative of a desired lighting property adjustment, and the one or more contributing lighting units may be instructed to implement the desired lighting property adjustment. As an additional example, one or more user inputs may be selectively enabled to receive the input indicative of the desired lighting property adjustment, e.g., in response to detection of a lighting context.

Generally, in one aspect, the invention relates to a mobile computing device that includes a light sensor, one or more user inputs, and a controller. The controller may be operably coupled to the light sensor and the one or more user inputs, and may be configured to: receive, via the one or more user inputs, input indicative of a desired lighting property adjustment for a lighting effect sensed by the light sensor; identify one or more LED-based lighting units that contribute to the sensed lighting effect; and generate, for wireless transmission to the one or more contributing LED-based lighting units, an instruction configured to cause at least some of the one or more contributing LED-based lighting units to implement the desired lighting property adjustment.

In various embodiments, the controller may be configured to generate, for wireless transmission to one or more nearby LED-based lighting units in response to receipt of the input indicative of the desired lighting property adjustment, a preliminary instruction for the one or more nearby LED-based lighting units to transmit coded light signals to identify themselves to the mobile computing device.

In various embodiments, the controller may be configured to identify the one or more contributing LED-based lighting units based on light output of the one or more contributing LED-based lighting units that is detected by the light sensor. In various versions, the controller may be configured to identify the one or more contributing LED-based lighting units based on a coded light signal carried in the detected light output of the one or more contributing LED-based lighting units.

In various embodiments, controller may be further configured to identify a first of the contributing LED-based lighting units that contributes more to the sensed lighting effect than one or more others of the one or more contributing LED-based lighting units. In various embodiments, the controller may be configured to generate, for wireless transmission to the one or more contributing LED-based lighting units in response to receipt of the input indicative of the desired lighting property adjustment, an instruction configured to cause at least some of the one or more contributing LED-based lighting units to implement a predetermined lighting effect. In various embodiments, the controller may be configured to generate the instruction to limit which of the one or more contributing LED-based lighting units implements the desired lighting property adjustment based on activity of other mobile computing devices nearby.

In various embodiments, the mobile computing device may include at least one contextual sensor. The controller may be further configured to selectively enable the one or more user inputs to receive the input indicative of the desired lighting property adjustment based on a lighting context detected by the at least one contextual sensor. In various versions, the lighting context may include a location of the mobile computing device. The controller may be configured to selectively enable the one or more user inputs based on a determination of whether the location is within a predefined area or within a predetermined distance of the one or more contributing LED-based lighting units.

In various versions of these embodiments, the at least one contextual sensor may be a GPS unit, and the lighting context may include coordinates provided by the GPS unit. In various versions, the controller may be configured to determine whether the location is within the predefined area or within the predetermined distance of the one or more contributing LED-based lighting units based on whether the coordinates provided by the GPS unit correspond to an entrance to a building.

The at least one contextual sensor may include a Wi-Fi interface, and the controller may be configured to determine whether the location is within the predefined area or within the predetermined distance of the one or more contributing LED-based lighting units based on Wi-Fi fingerprinting.

Also, the light sensor may be the at least one contextual sensor, and the lighting context may include a coded light signal carried in light output produced by the one or more contributing LED-based lighting units. In various versions, the mobile computing device may include a touch screen. Selectively enabling the one or more user inputs may include selective rendition of one or more aspects of a user interface on the touch screen.

In various versions, the at least one contextual sensor may include a Wi-Fi interface. The lighting context may include connection, by the mobile computing device via the Wi-Fi interface, with a Wi-Fi base station.

In another aspect, the invention relates to a mobile computing device that includes at least one contextual sensor; one or more user inputs; and a controller operably coupled to the at least one contextual sensor and the one or more user inputs. The controller may be configured to: selectively enable the one or more user inputs to receive input indicative of a desired lighting property adjustment for light output produced by one or more LED-based lighting units, based on a lighting context detected by the at least one contextual sensor; and generate, for wireless transmission to the one or more LED-based lighting units in response to receipt at the one or more inputs of the desired lighting property adjustment, an instruction configured to cause at least some of the one or more LED-based lighting units to implement the desired lighting property adjustment.

In various embodiments, the lighting context may include a location of the mobile computing device. The controller may be configured to selectively enable the one or more user inputs based on a determination of whether the location is within a predefined area or within a predetermined distance of the one or more LED-based lighting units.

In various embodiments, the at least one contextual sensor may include a GPS unit, and the lighting context may include coordinates provided by the GPS unit. In various versions, the controller may be further configured to determine whether the location is within the predefined area or within the predetermined distance of the one or more LED-based lighting units based on whether the coordinates provided by the GPS unit correspond to an entrance to a building.

In various embodiments, the at least one contextual sensor may include a Wi-Fi interface. The controller may be configured to determine whether the location is within the predefined area or within the predetermined distance of the one or more LED-based lighting units based on Wi-Fi fingerprinting.

In various embodiments, the at least one contextual sensor may include a Wi-Fi interface, and the lighting context may include connection, by the mobile computing device via the Wi-Fi interface, with a Wi-Fi base station.

In various embodiments, the light sensor may be the at least one contextual sensor, and the lighting context may include a coded light signal carried in light output produced by the one or more LED-based lighting units.

In various embodiments, the at least one contextual sensor may include an NFC interface, and the lighting context may include authorization received at the NFC interface to control a lighting property of the one or more LED-based lighting units. In various embodiments, the lighting context may include a determination that the mobile computing device is in a hand of a user.

In various embodiments, the light sensor may include the at least one contextual sensor, and the lighting context may include a lighting property of the sensed lighting effect detected by the light sensor. In various versions, the detected lighting property of the sensed lighting effect may include a brightness, and the controller may be configured to selectively enable the one or more user inputs based on whether the detected brightness is above a first predetermined threshold or below a second predetermined threshold.

In various embodiments, the mobile computing device may include a touch screen. Selectively enabling the one or more user inputs may include selective rendition of one or more aspects of a user interface on the touch screen. In various embodiments, the mobile computing device may include a microphone. Selectively enabling the one or more user inputs may include activation of the microphone to receive a spoken command. In various embodiments, the mobile computing device may include an accelerometer. Selectively enabling the one or more user inputs may include activation of the accelerometer to detect a user gesture.

In various embodiments, the lighting context may include a sequence of contextual cues and the controller may be configured to selectively enable one or more aspects of the one or more user inputs based on the detected sequence. In various embodiments, the controller may be configured to generate, for transmission to one or more nearby LED-based lighting units in response to receipt of the input indicative of the desired lighting property adjustment, a preliminary instruction for the one or more nearby LED-based lighting units to transmit coded light signals that identify themselves to the mobile computing device.

In various embodiments, the at least one contextual sensor includes a light sensor configured to sense a lighting effect. The controller may be configured to identify one or more LED-based lighting units that contribute to the sensed lighting effect based on light output of the one or more LED-based lighting units that is detected by the light sensor.

Methods, systems and computer-readable media (transitory and non-transitory) may also be provided to implement selected aspects of the above-described embodiments.

For example, in yet another aspect, the invention relates to a computer-implemented method for lighting control, including the steps of receiving, by a mobile computing device, input indicative of a desired lighting property adjustment for a lighting effect sensed by a light sensor of the mobile computing device; identifying, by the mobile computing device, one or more LED-based lighting units that contribute to the sensed lighting effect; and generating, by the mobile computing device for wireless transmission to the one or more contributing LED-based lighting units, an instruction configured to cause at least some of the one or more contributing LED-based lighting units to implement the desired lighting property adjustment. The step of identifying one or more LED-based lighting units that contribute to the sensed lighting effect may include generating a preliminary instruction for one or more nearby LED-based lighting units to transmit coded light signals to identify themselves to the mobile computing device.

In some embodiments, the mobile computing device may be configured to identify the one or more contributing LED-based lighting units based on light output of the one or more contributing LED-based lighting units that is detected by the light sensor. In other embodiments, the mobile computing device may be configured to identify the one or more contributing LED-based lighting units based on a coded light signal carried in the detected light output of the one or more contributing LED-based lighting units.

In some embodiments, the instruction configured to cause at least some of the one or more contributing LED-based lighting units to implement the desired lighting property adjustment includes an instruction to limit which of the one or more contributing LED-based lighting units implements the desired lighting property adjustment based on activity of other mobile computing devices nearby.

In various embodiments, the method may include detecting, by at least one contextual sensor, a lighting context and selectively enabling one or more user inputs indicative of the desired lighting property adjustment based on the lighting context. The lighting context may include a location of the mobile computing device, and the mobile computing device may be configured to selectively enable the one or more user inputs based on a determination of whether the location is within a predefined area or within a predetermined distance of the one or more contributing LED-based lighting units. In one example, the at least one contextual sensor includes a GPS unit, and the lighting context comprises coordinates provided by the GPS unit. The mobile computing device may be further configured to determine whether the location is within the predefined area or within the predetermined distance of the one or more contributing LED-based lighting units based on whether the coordinates provided by the GPS unit correspond to an entrance to a building. In some versions of these embodiments, the at least one contextual sensor includes a Wi-Fi interface, and the mobile computing device is configured to determine whether the location is within the predefined area or within the predetermined distance of the one or more contributing LED-based lighting units based on Wi-Fi fingerprinting. Also, the light sensor may include the at least one contextual sensor, and the lighting context may include a coded light signal carried in light output produced by the one or more contributing LED-based lighting units. Further, the at least one contextual sensor may include a Wi-Fi interface, and the lighting context may include connection, by the mobile computing device via the Wi-Fi interface, with a Wi-Fi base station. The lighting context may also include a determination that the mobile computing device is in a hand of a user.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs The term "light source" should be understood to refer to any one or more of a variety of radiation sources, including, but not limited to, LED-based sources (including one or more LEDs as defined above). A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light.

The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources.

The term "controller" is used herein generally to describe various apparatus relating to, among other functions, the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s).

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting units such as LED-based lighting units may be controlled by mobile computing devices, such as smart phones or tablets. For example, a user may be able to select and control various lighting units in a building or room using her smart phone. In some instances it may be desirable to enable such a user to quickly and easily control only lighting units in the immediate area around her, e.g., those lighting units that actually contribute to a lighting effect consumed by the user. Requiring the user to operate a user interface to select these local light units adds an additional step for the user, who may simply want to create more or less light generally at her current location quickly and easily.

On a mobile device such as a smart phone or tablet, accessing applications, including lighting control applications, may be cumbersome. The mobile device may first need to be unlocked and/or otherwise "awakened." Then, a user may be required to locate the lighting control application. These steps may be more complex and cumbersome than simply locating and adjusting manual lighting controls associated with the lighting units.

Thus, Applicants have recognized and appreciated that it would be beneficial to make it easier and/or more convenient to implement a lighting property adjustment at lighting units that affect local lighting effect consumed by a user, and/or to access user inputs for controlling lighting units. In view of the foregoing, various embodiments and implementations of the present invention are directed to enabling implementation of a desired lighting property adjustment on light sources that contribute to an observed lighting effect using a mobile device, as well as selectively enabling one or more user inputs on the mobile device based on a detected lighting context.

Figure 1:
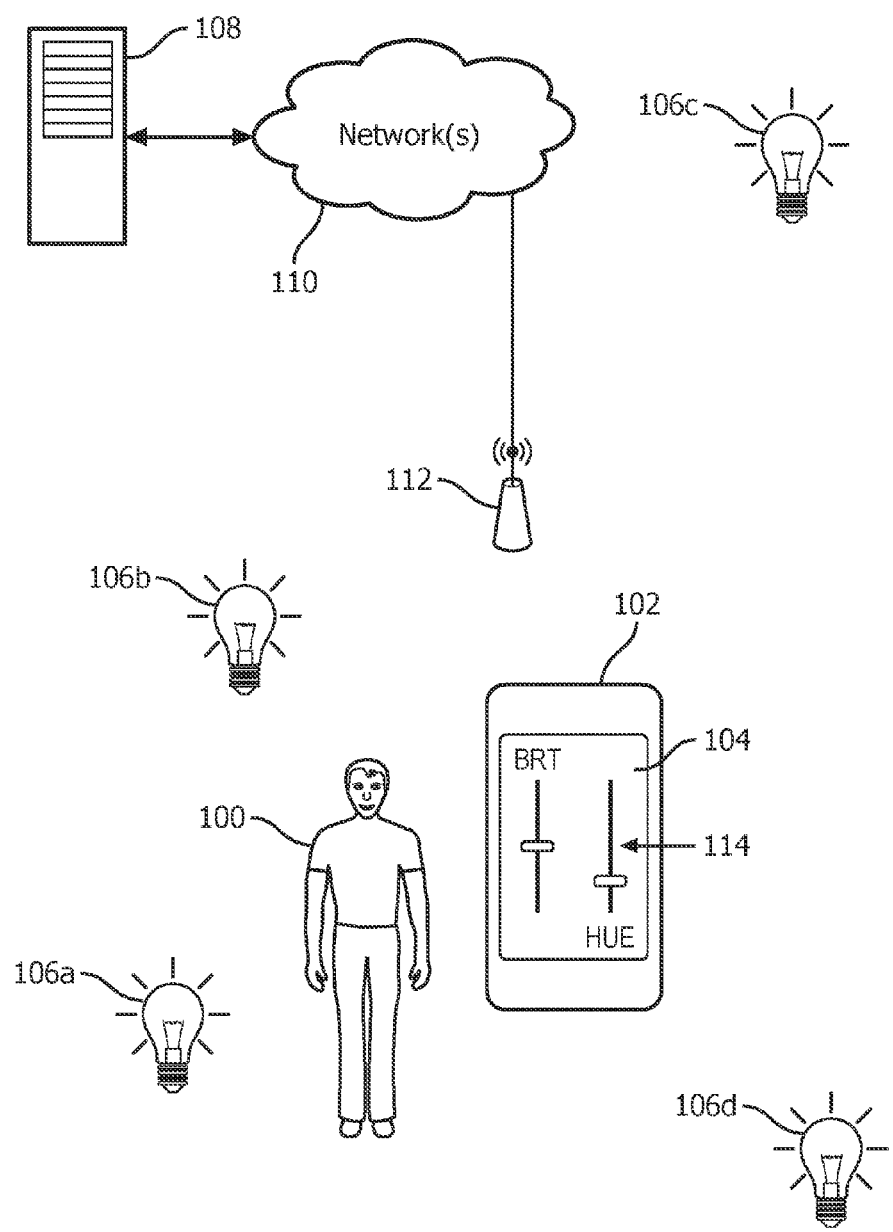
FIG. 1 schematically illustrates an example mobile computing device in the form of a smart phone, configured with selected aspects of the present disclosure, interacting with a plurality of LED-based lighting units, in accordance with various embodiments.

Referring to FIG. 1, in one embodiment, a user 100 operates a mobile computing device, depicted in the form of a smart phone 102, that is configured to implement selected aspects of the present disclosure. While smart phone 102 will be referenced in various examples described herein, this is not meant to be limiting, and it should be understood that other mobile computing devices, such as tablet computers, laptops, personal digital assistants, and custom remote controls may be configured to control lighting as described herein. Smart phone 102 may include a touch screen display 104, as well as other components that will be discussed below.

User 100 is shown at various proximities from a plurality of LED-based lighting units, 106a-106d (each may be referred to generically as "LED-based lighting unit 106"). Four LED-based lighting units are depicted in FIG. 1 for illustrative purposes. It should be understood that any number of LED-based lighting units may be controlled using mobile devices such as smart phone 102 and techniques described herein. Moreover, while "LED-based lighting units" are referenced in numerous examples described herein, this is not meant to be limiting, and other types of lighting units capable of being controlled and having their lighting properties adjusted may be used instead.

Each LED-based lighting unit 106 may be configured to be wirelessly controlled by mobile computing devices such as smart phone 102. For example, plurality of LED-based lighting units 106a-d may be in network communication with each other and/or a lighting control computing system 108 through one or more networks 110. In some embodiments, one or more networks 110 may include a wireless network, such as a Wi-Fi network provided by an access point 112. In some embodiments, plurality of LED-based lighting units 106a-d may be configured to communicate with each other and/or other computing systems, such as smart phone 102, using other communication technologies, including but not limited to ZigBee, coded light transmissions, RFID, NFC, and so forth. In some embodiments where a Wi-Fi network is present but plurality of LED-based lighting units 106a-d are not Wi-Fi-compatible, an IP bridge may be established between the Wi-Fi network and a dedicated wireless communication technology (e.g., ZigBee) used by plurality of LED-based lighting units 106a-d. In some embodiments where multiple LED-based lighting units are part of a group, causing one LED-based lighting unit to implement a desired lighting property adjustment may cause other LED-based lighting units in the group to automatically implement or contribute to implementation of the lighting property adjustment.

In various embodiments, smart phone 102 may be configured to receive, e.g., via one or more user inputs such as touch screen 104, input indicative of a desired lighting property adjustment for a lighting effect. For example, in FIG. 1, a graphical user interface (GUI) 114 is rendered on touch screen 104, and includes two sliders: "BRT" for adjusting brightness; and "HUE" for adjusting a hue. Various other user inputs that may be used to receive input indicative of desired lighting adjustments will be described below with reference to FIGS. 2-5.

In various embodiments, the lighting effect may be a local lighting effect (e.g., the light in a room or setting) sensed by a light sensor (see FIG. 2) associated with smart phone 102. Smart phone 102 may be configured to identify one or more LED-based lighting units (e.g., from plurality of LED-based lighting units 106a-d) that contribute to the sensed lighting effect. For instance, in FIG. 1, LED-based lighting units 106a and 106b are relatively close to user 100 and smart phone 102, and thus, light they emit may contribute more to a light effect sensed by smart phone 102 than LED-based lighting unit 106d, which is farther from smart phone 102 than LED-based lighting units 106a and 106b. LED-based lighting unit 106c is even farther away from smart phone 102, and thus light it emits may contribute even less than light emitted from LED-based lighting units 106a, 106b and 106d.

In various embodiments, smart phone 102 may generate, e.g., for wireless transmission to the one or more contributing LED-based lighting units or to lighting control computing system 108, an instruction configured to cause at least some of the one or more contributing LED-based lighting units to implement the user's desired lighting property adjustment. For instance, smart phone 102 may transmit the instruction over network 110 through access point 112 to lighting control computing system 108. Lighting control computing system 108 may then instruct one or more of plurality of LED-based lighting units 106a-d to implement the desired lighting property adjustment. If plurality of LED-based lighting units 106a-d are equipped to receive coded light signals, then smart phone 102 may additionally or alternatively transmit a coded light signal (e.g., using a camera flash) carrying the generated instruction to plurality of LED-based lighting units 106a-d. If plurality of LED-based lighting units 106a-d are equipped to communicate using Wi-Fi, then smart phone 102 may additionally or alternatively transmit the instruction to plurality of LED-based lighting units 106a-d through access point 112 and network 110.

In order to identify the one or more contributing LED-based lighting units, smart phone 102 may wirelessly broadcast a preliminary instruction to cause one or more nearby LED-based lighting units to identify themselves to smart phone 102. For instance, in some embodiments, the preliminary instruction may cause one or more LED-based lighting units to briefly illuminate (e.g., at a low intensity) and broadcast coded light signals that identify themselves. In various embodiments, smart phone 102 may generate this preliminary instruction immediately after receiving the input indicative of the desired lighting property adjustment. In embodiments in which LED-based lighting units are not equipped to transmit coded light signals, the LED-based lighting units may instead blink in a predefined and identifying sequence known to smart phone 102. In some cases, the blinks are sufficiently brief to be imperceptible to user 100.

In some embodiments, smart phone 102 may be configured to identify a particular contributing LED-based lighting unit that contributes more to the sensed lighting effect than one or more others of the one or more contributing LED-based lighting units. For instance, smart phone 102 may capture, e.g., using a front or rear facing camera, a digital image of one or more LED-based lighting units. In some embodiments, smart phone 102 may employ a rolling shutter image capture technique. Smart phone 102 may then analyze the captured digital image to determine which LED-based lighting unit is contributing more than others, or which LED-based lighting unit is closest. Smart phone 102 may then tailor an instruction to that highest-contributing LED-based lighting unit that causes it to play a larger role in collective implementation of a desired lighting property adjustment of user 100 than other contributing LED-based lighting units.

In various embodiments, smart phone 102 may be programmed, e.g., by user 100, with predefined lighting effects that represent preferences of user 100. For example, user 100 may have a particular default light setting that she prefers in a particular room in her house. If the room is dark when user 100 walks in, when she operates smart phone 102 to enable light control inputs (e.g., by opening a lighting control application), smart phone 102 may first generate an instruction configured to cause at least some LED-based lighting units in the room to implement the predefined lighting effect. Then, when user 100 provides input indicative of a desired lighting property adjustment, smart phone 102 may generate an instruction that causes the one or more contributing LED-based light sources in the room to implement the desired lighting property adjustment.

Confusion may arise if multiple mobile computing devices such as smart phone 102 are being operated simultaneously to control an area's lighting. Accordingly, in various embodiments, smart phone 102 may be configured to generate the desired lighting property adjustment instruction in a manner that limits which of the one or more contributing LED-based lighting units implements the desired lighting property adjustment. This generation may be based on various data, including but not limited to a social context (e.g., determined from a social networking application executing on smart phone 102), activity of nearby mobile computing devices (e.g., recently or simultaneously used to control a local lighting effect), and so forth. For example, if user 100 is eating dinner in a crowded restaurant with controllable LED-based lighting units, smart phone 102 may only instruct LED-based lighting units at or near a table of user 100 to implement a desired lighting property adjustment.

Figure 2:
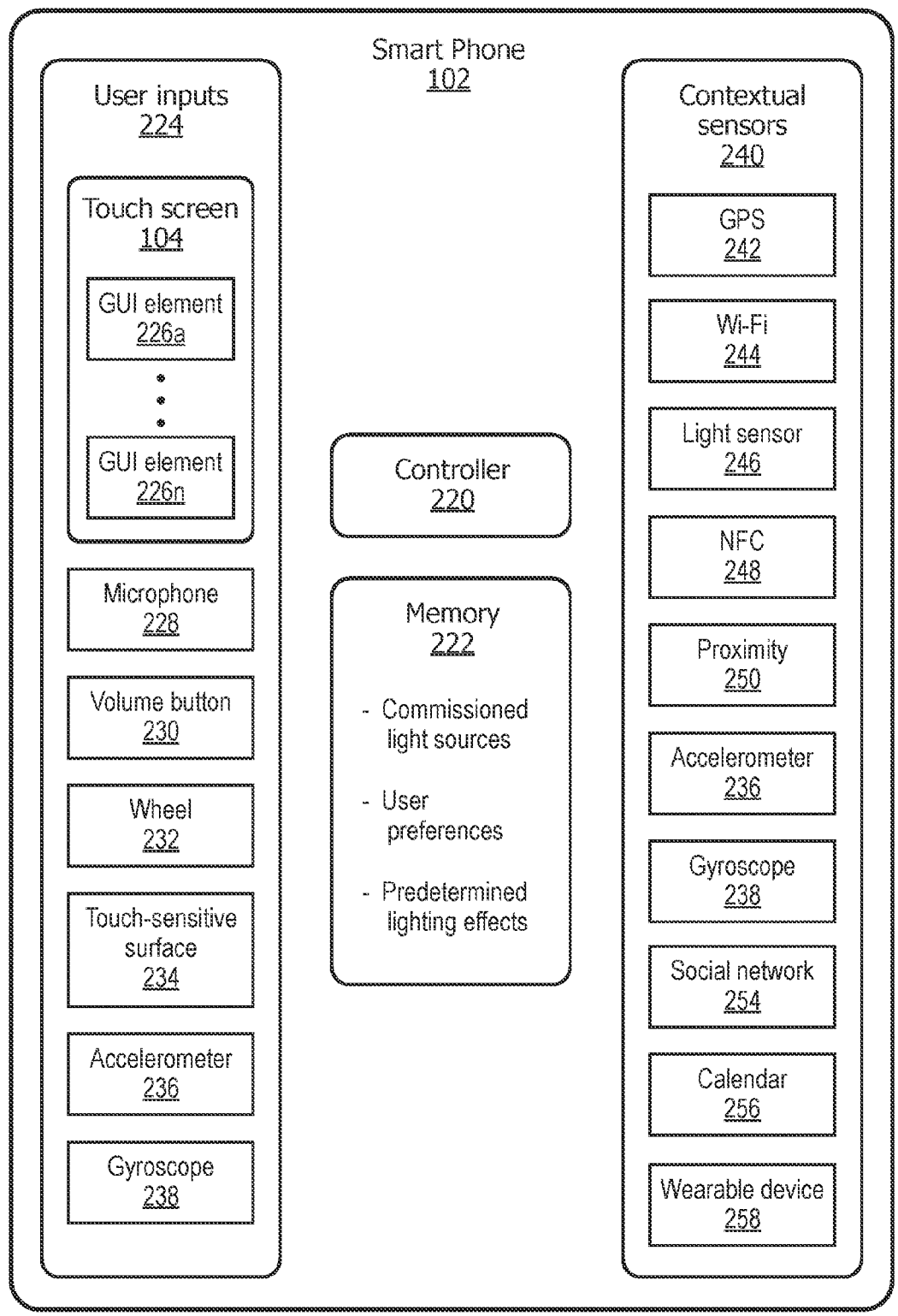
FIG. 2 schematically depicts example components of a smart phone configured with selected aspects of the present disclosure, in accordance with various embodiments.

Referring to FIG. 2, smart phone 102 may include a controller 220 operably coupled to memory 222. Smart phone 102 may also include a plurality of user inputs 224.

User inputs 224 may come in various forms, and may be implemented using any combination of hardware and software. For example, touch screen 104 was mentioned above in reference to FIG. 1. Controller 220 may be configured to render, on touch screen 104, one or more GUI elements 226a-n. GUI elements 226a-n may come in various forms, including but not limited to the sliders shown in FIG. 1, wheels that can be rotated to alter a lighting property (e.g., color wheels), checkboxes, buttons, or any other standard GUI input element. In some embodiments, GUI elements 226 may be operable to run macros that cause automatic implementation of predefined lighting preferences. For instance, one button may be operable to cause one or more LED-based lighting units to implement a "concentrating" lighting scheme. Another button may be operable to cause one or more LED-based lighting units to implement a "party" lighting scheme, which could include more festive and/or animated lighting.

In various embodiments, user inputs 224 may include a microphone 228. Microphone 228 may be configured to receive a spoken command (e.g., "make more light," "create romantic light") from user 100. Smart phone 102 may be equipped with voice recognition hardware and/or software (not shown) to translate spoken user commands to digital commands configured to cause smart phone 102 to generate desired lighting property adjustment instructions for wireless transmission to one or more LED-based lighting units (e.g., 106a-d). In some embodiments, user 100 may specify that only local light should be adjusted (e.g., "dim light here"), or that all controllable light in the vicinity should be adjusted (e.g., "dim light").

In various embodiments, user inputs 224 may include various hardware controls on an exterior of smart phone 102. For example, volume up/down buttons 230 may, when smart phone 102 is operating in the context of lighting control, be operated by user 100 to provide desired lighting property adjustments (e.g., turn brightness up/down). Similarly, a one- or two-dimensional wheel 232, which may nominally be used to adjust volume or move a cursor around touch screen 104, etc., may be requisitioned for lighting control.

In various embodiments, user inputs 224 may include one or more touch-sensitive exterior surfaces 234 of smart phone 102. These exterior surfaces may be rendered touch-sensitive by means of one or more capacitive touch pads, or with other similar techniques, such as swept frequency capacitive sensing. These touch-sensitive exterior surfaces may be located on various parts of the exterior of smart phone 102, such as around its outer rim, on its back, and so forth. For example, in FIG. 3, a user is shown touching a top edge of smart phone 102, which may cause smart phone 102 to generate a desired lighting property adjustment instruction in a manner that reflects how the user moves her finger along the top. For example, if the user slides her finger in one direction, smart phone 102 may generate the desired lighting property adjustment instruction to cause one or more LED-based lighting units to turn brightness up. If the user slides her finger in an opposite direction, smart phone 102 may generate the desired lighting property adjustment instruction to cause one or more LED-based lighting units to turn brightness down. Other touch-sensitive exterior surfaces of smart phone 102, such as its back surface, sides, or bottom, may be operated in a similar manner.

Referring back to FIG. 2, in various embodiments, user inputs 224 may further include one or more accelerometers 236 (hereinafter referred to in the singular, "accelerometer"). Additionally or alternatively, in various embodiments, user inputs 224 may include one or more gyroscopes 238 (hereinafter referred to in the singular, "gyroscope"). In some embodiments, three gyroscopes 238 may be employed to facilitate three-dimensional gesture recognition. Accelerometer 236 and/or gyroscope 238 may be configured to detect movement of smart phone 102, and provide controller 220 with one or more signals representative of that detected movement. Thus, user 100 may make one or more gestures with smart phone 102, which may cause smart phone 102 to generate an appropriate desired lighting property adjustment instruction.

Figure 4:
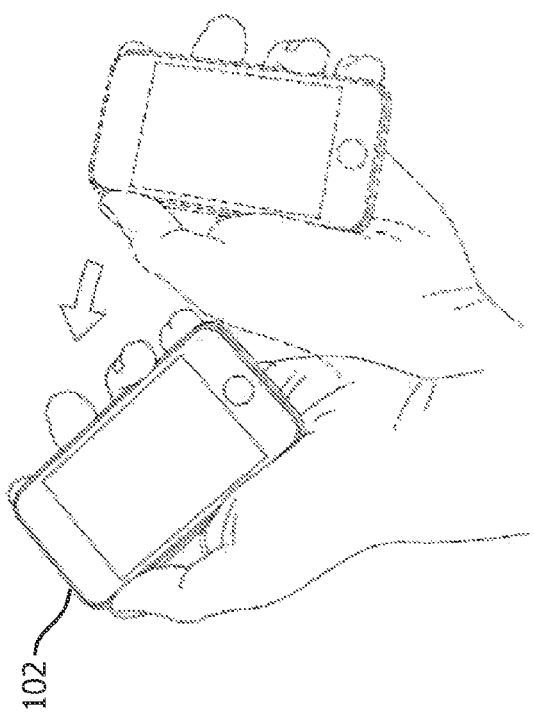
FIGS. 3-5 depict examples of how a user may interact with a smart phone to control lighting.

For instance, FIG. 4 depicts smart phone 102 being tilted from one side to another, which may cause smart phone 102 to generate the desired lighting property adjustment instruction to cause one or more LED-based lighting units to increase/decrease a lighting property. Other gestures may cause different lighting changes. For example, a shake may cause smart phone 102 to generate the desired lighting property adjustment instruction to cause one or more LED-based lighting units turn on/off, or to create an animated lighting effect. A wave may cause an adjustment to lighting intensity. Tapping smart phone 102 may cause one or more LED-based lighting units to turn off or toggle through various predefined lighting effects. In some embodiments, a camera (not shown) could capture one or more digital images of a gesture (e.g., made with a user's hand), which controller 220 could recognize, e.g., by matching the captured gesture to a library of potential gestures.

Figure 5:
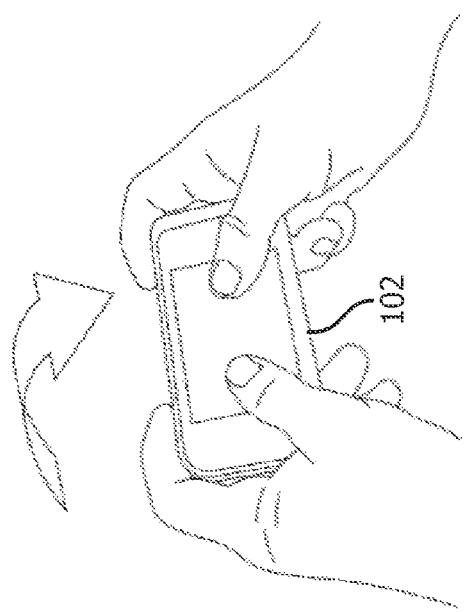
Figure 3:
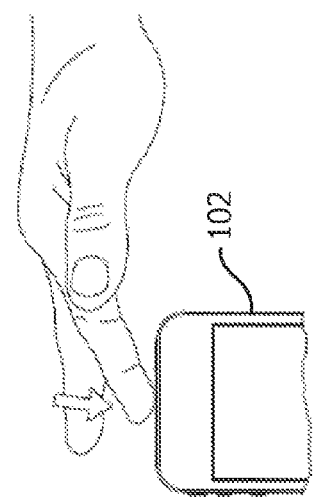

As another example, controller 220 may enable touch screen 104 and/or one or more touch-sensitive surfaces 234 to respond to various types of tactile input to allow user 100 to control lighting. For example, as shown in FIG. 5, user may "double tap" touch screen 104 or another touch sensitive surface 234 to perform some lighting control action. In some embodiments, user 100 may slide her fingers closer together, farther apart, or in a circle to adjust various lighting properties (e.g., brightness, the size of a lighting effect produced by an LED-based lighting unit, etc.). When user 100 is initially learning how to use this interface, GUI elements 226 may be displayed to guide user 100 through these actions. Later, when user 100 is more comfortable with the interface, fewer or no GUI elements 226 may be rendered.

As mentioned above, requiring user 100 to unlock smart phone 102 and locate/open a lighting control application before she can adjust one or more lighting properties may be cumbersome. Accordingly, in various embodiments, mobile devices such as smart phone 102 may be configured to selectively enable the one or more user inputs 224 to receive the input indicative of the desired lighting property adjustment based on a lighting context (also referred to as a "contextual cue") detected by at least one contextual sensor 240 associated with the mobile computing device. This way, user 100 may avoid having to unlock smart phone 102, locate a lighting control application, open the lighting control application, and in some cases configure the lighting application to control a particular LED-based lighting source. Instead, when smart phone 102 detects one or more contextual cues, smart phone 102 may instantly and automatically enable inputs (e.g., sliders rendered on touch screen 104, touch-sensitive surfaces 234, activated accelerometer 236, etc.) so that user 100 can immediately control lighting.

Contextually-triggered instant access to lighting control may be implemented in various ways. In some embodiments, all or a portion of a lighting control application may execute on smart phone 102, e.g., as a background process, so that it is able to "awaken" instantly on detection by smart phone 102 of one or more lighting contexts.

In various embodiments, the detected lighting context may be a location of smart phone 102. For instance, controller 220 may selectively enable one or more user inputs 224 based on a determination of whether smart phone 102 is within a predefined area that is known to offer a controllable lighting infrastructure, or within a predetermined distance of the one or more LED-based lighting units (e.g., 106a-d) that user 100 is authorized to control. In some such embodiments, smart phone 102 may be equipped with a GPS unit 242, and the lighting context may be coordinates provided by GPS unit 242.

In some instances, such as when user 100 enters into a building or area that blocks a GPS signal, smart phone 102 may rely on other means for determining its location. For instance, in some embodiments, controller 220 may be configured to determine whether smart phone 102 is within a predefined area or within a predetermined distance of one or more LED-based lighting units based on whether the coordinates provided by GPS unit 242 correspond to an entrance to a building. If user 100 passes through the building's entrance, the last GPS coordinate provided by GPS unit 242 may be at the entrance. Smart phone 102 may presume that user 100 has entered the building, and may then automatically enable one or more user inputs 224 to receive input indicative of a desired lighting property adjustment for one or more LED-based lighting units in the building. Likewise, if, after a period of time without a GPS signal, a first GPS coordinate provided by GPS unit 242 is at the building's entrance, smart phone 102 may presume that user 100 has left the building, and may disable the previously-enabled user inputs 224.

Other non-GPS techniques may also be used to determine a location of smart phone 102. For example, contextual sensors 240 of smart phone 102 may include a Wi-Fi interface 244. In various embodiments, controller 220 may be configured to determine whether the location of smart phone 102 is within the predefined area or within the predetermined distance of the one or more contributing LED-based lighting units based on Wi-Fi fingerprinting and/or triangulation. Additionally or alternatively, smart phone 102 may deduce its location by virtue of connection to a Wi-Fi base station that the smart phone 102 knows to be in a particular location, such as a user's home. Other wireless technologies may similarly be used to determine a location of smart phone 102, including but not limited to Bluetooth, a cellular signal (e.g., through GSM tower triangulation), SiRFusion, GPS pseudolites, and so forth.

Non-location-based contextual cues may also trigger controller 220 to selectively enable one or more user inputs 224. For example, in various embodiments, contextual sensors 240 may include a light sensor 246. Light sensor 246 may come in various forms, including a digital camera (on a front or back of smart phone 102) and/or a photocell. In some embodiments, light sensor 246 may sense a local lighting effect (e.g., immediately-observable light), that may in include one or more lighting properties (e.g., brightness, hue, saturation, etc.). Assuming LED-based lighting units contributing to the local lighting effect are "known" by smart phone 102 (e.g., through a process of "commissioning," described below), controller 220 may selectively enable one or more user inputs 224 based on the sensed lighting properties. For example, if the sensed local lighting effect is darker or lighter than predefined preferences of user 100 (e.g., the user walks into a dark room), controller 220 may automatically render a brightness slider on touch screen 104 so that user 100 is instantly able to turn the brightness up or down. Additionally or alternatively, when ambient light drops below a certain threshold, e.g., after sunset, controller 220 may selectively enable one or more user inputs 224 so that user 100 may turn on the lights or turn up brightness.

As another example of a lighting property that can act as a contextual cue, light sensor 246 may be configured to detect a coded light signal carried in light output produced by one or more LED-based lighting units (e.g., one or more of 106*a-d*). Based on the received coded light, controller 220 may selectively enable one or more user inputs 224. For instance, if the coded light identifies an LED-based lighting unit as one that is "known" by smart phone 102, then smart phone 102 may enable one or more user inputs 224 so that user 100 is able to instantly control that LED-based lighting unit without having to unlock the phone, find and open the lighting control application, etc.

In various embodiments, contextual sensors 240 of smart phone 102 may include an NFC interface 248. In other embodiments, smart phone 102 may additionally or alternatively include other radio interfaces, including but not limited to RFID, Bluetooth, etc. On detection of a contextual cue in the form of an authorization provided through and/or received at NFC interface 248, controller 220 of smart phone 102 may selectively enable one or more user inputs 224 so that user 100 is instantly able to control a lighting property of the one or more LED-based lighting units. For instance, a user walking into her place of employment may be required to provide credentials that authorize the user to enter, e.g., by tapping an NFC-enabled device such as smart phone 102 against an NFC reader. Once smart phone 102 detects that user has provided the authorization (or that NFC interface 248 has received a suitable response), controller 220 may automatically enable one or more of user inputs 224 to enable the user to instantly adjust lighting in her office.

In various embodiments, contextual sensors 240 of smart phone 102 may additionally or alternatively include a proximity sensor 250. In various embodiments, controller 220 may determine, based on information provided by proximity sensor 250, that smart phone 102 is in a hand of user 100, or at least is no longer in the user's pocket. In response, controller 220 may selectively enable one or more user inputs 224 to receive input indicative of a desired lighting property adjustment.

In various embodiments, contextual sensors 240 of smart phone 102 may include accelerometer 236 and/or gyroscope 238. For instance, accelerometer 236 and/or gyroscope 238 may detect that user 100 has made a particular two-dimensional or three-dimensional gesture with smart phone 102 (e.g., a motion to remove smart phone 102 from a pocket, a predefined gesture, etc.). In response, controller 220 may selectively enable one or more user inputs 224 to enable user 100 to provide input indicative of a desired lighting property adjustment.

In various embodiments, contextual sensors 240 of smart phone 102 may include information from one or more social networks 254 of which user 100 is a member. For instance, if user 100 operates a locally-installed social network client to update her social networking status to "relaxing," then controller 220 may selectively enable one or more user inputs 224 so that user 100 is instantly able to adjust nearby lighting to have more relaxing lighting properties.

In various embodiments, contextual sensors 240 of smart phone 102 may include a calendar 256. For example, if user 100 is scheduled to arrive home at 5:30, controller 220 may selectively enable one or more user inputs 224 at 5:30 so that user 100 can adjust lighting immediately when she walks in the door.

In various embodiments, contextual sensors 240 of smart phone 102 may include one or more wearable devices 258. For example, smart phone 102 may often be in the user's pocket, in which case it would not have line of sight with an LED-based lighting unit to transmit or receive, e.g., light coded signals. However, wearable device 258, which could be a headset, Bluetooth-connected watch, computing glasses, and so forth, may have line of sight with the LED-based lighting unit. Wearable device 258 may detect various contextual cues and send indication of those detected cues to smart phone 102. In some embodiments, wearable device 258 may be considered a "personal" device, and may be used as a key that permits controller 220 to enable more user inputs 224 than might be possible without.

In some embodiments, lighting contexts may come in the form of receipt, at one or more user inputs 224, of other predefined inputs and/or predefined sequences of inputs. For instance, user 100 could perform an unusual gesture with smart phone 102 while locked that causes one or more GUI elements 226*a-n* to be rendered on touch screen 104, without unlocking smart phone 102. Additionally or alternatively, user 100 could perform a custom gesture on a touch-sensitive exterior surface of smart phone 102, grip smart phone 102 in a particular manner, press some combination of keys simultaneously (e.g., volume up and down at the same time), manipulate a light application icon on a home "locked" screen (similar to a camera or telephone icon on existing smart phones), and so forth. Any of these contexts may cause controller 220 to selectively enable one or more user inputs 224 to receive input indicative of a desired lighting property adjustment without unlocking smart phone 102. In some embodiments, in addition to or instead of selectively enabling one or more user inputs 224, one or more of these contexts may cause controller 220 to evoke an initial or pre-defined lighting effect.

User inputs 224 may be selectively enabled in various ways in response to open or more contextual cues. For example, a first of GUI elements 226*a-n* may be enabled (e.g., rendered on touchscreen 104) in response to a determination that smart phone 102 is sufficiently proximate to LED-based lighting unit 106*a*, and a second of GUI elements 226*a-n* may be enabled in response to a determination that smart phone 102 is sufficiently proximate to LED-based lighting unit 106*d*. Additionally or alternatively, more and more GUI elements 226*a-n* may be progressively rendered on touch screen 104 as multiple contextual cues in combination or sequence are detected. For instance, as user 100 pulls up to her home (as detected, e.g., by GPS), a first GUI element 226 may be rendered to control lighting near the parking spot and/or in the lawn. A predetermining lighting effect may also be rendered by LED-based lighting units near the parking spot and/or in the yard, so that user 100 can find her way into the house. More GUI elements 226 may be added as user 100 walks into the house and smart phone 102 detects coded light signals from various lighting units.

As another example, assume smart phone 102 has only identified LED-based lighting unit 106*a* based on a coded light signal it broadcasts, and that smart phone 102 has not detected any other relevant lighting contexts. In such a scenario, controller 220 may enable only sufficient user inputs 224 of smart phone 102 to provide user 100 with rudimentary control of lighting properties of LED-based lighting unit 106*a* (e.g., its brightness). For instance, controller 220 may render a single brightness slider on touch screen 104. On the other hand, if smart phone 102 detects additional lighting contexts, such as provision by user 100 of valid credentials via NFC interface 248, then more user inputs 224 may be enabled to provide user 100 with more complete control over one or more lighting properties of LED-based lighting unit 106a. For instance, controller 220 may render controls on touch screen 104 that allow user 100 to adjust other lighting properties (e.g., hue, saturation, etc.) of LED-based lighting unit 106a.

As mentioned above, one or more LED-based lighting units (e.g., 106a-d) may be "commissioned" by smart phone 102 so that smart phone 102 is able to identify and control lighting properties output by those lighting units later. In some embodiments, a user may commission an LED-based lighting unit by enabling a coded light signal emitted by the LED-based lighting unit to be received by light sensor 246. The coded light signal may contain a lighting unit identifier and/or location associated with the LED-based lighting unit. Controller 220 may store this information in memory 222. In other embodiments, smart phone 102 itself may determine the location of the LED-based lighting unit, e.g., using its own GPS unit 242 or other means described above, such as Wi-Fi fingerprinting.

In some embodiments, controller 220 may render a GUI element 226 on touch screen 104 when user 100 carries smart phone 102 into a space that includes one or more lighting units that are controllable using mobile computing devices. This GUI element 226 may provide user 100 with an opportunity to commission one or more local lighting units so that user 100 can easily control them next time user 100 is in the area. In some embodiments, controller 220 may render this GUI element 226 after user 100 opens a lighting control application. In other embodiments, controller 220 may render this GUI element 226 automatically, e.g., on detection of one or more lighting contexts.

In some scenarios, the commissioning step may be skipped where an LED-based lighting unit broadcasts its coordinates and/or identifying information, e.g., using coded light or on a Wi-Fi network. In such case, a mobile computing device such as smart phone 102 may enable one or more user inputs 224 to receive input indicative of a desired lighting property adjustment, even if smart phone 102 has not previously encountered the LED-based lighting units in question.

In various embodiments, mobile computing devices such as smart phone 102 may be configured to monitor a local lighting effect, e.g., using light sensor 246, and to adjust lighting and/or selectively enable or disable user inputs 224 based on this feedback. In some cases, smart phone 102 may estimate a size of a lighting effect and/or an implemented lighting property adjustment, and may calibrate, e.g., in real time, additional lighting property adjustments to be made to each controlled, contributing LED-based lighting unit.

Figure 6:
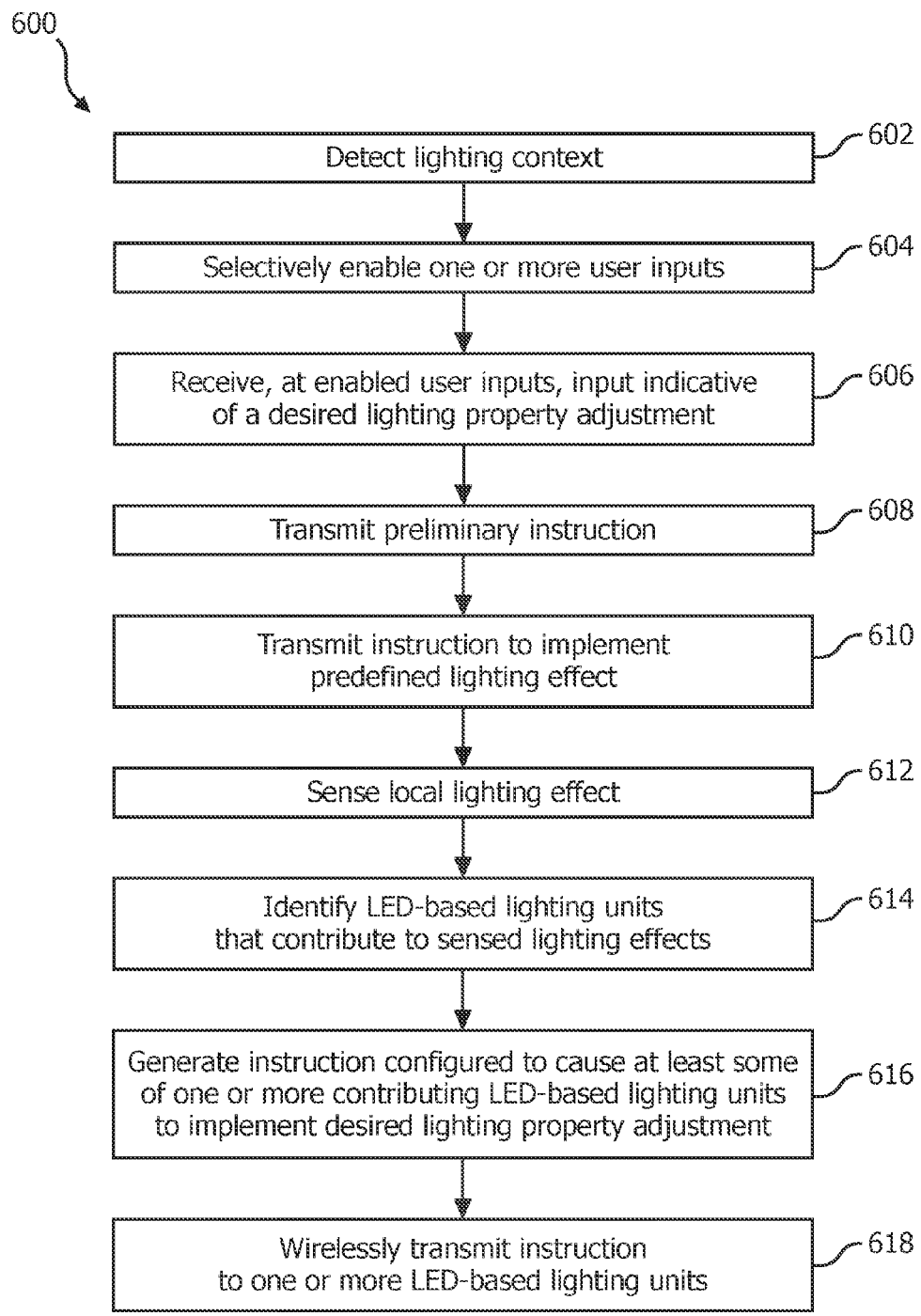
FIG. 6 depicts an example method that may be implemented by a mobile computing device configured with selected aspects of the present disclosure, in accordance with various embodiments.

FIG. 6 depicts an example method 600 that may be implemented by mobile computing devices such as smart phone 102, in accordance with various embodiments. FIG. 6 is not meant to be limiting, and one or more operations of FIG. 6 may be implemented in different orders and/or omitted altogether.

At block 602, a lighting context may be detected, e.g., by one or more contextual sensors 240. At block 604, one or more user inputs 224 may be selectively enabled, e.g., by controller 220, based on the detected lighting context. For example, controller 220 may render on touch screen 104 a slider or other GUI element 226 that is operable by a user to adjust a lighting property of light produced by an LED-based lighting unit that contributes to the locally-sensed lighting effect.

At block 606, input indicative of a desired lighting property adjustment may be received, e.g., at the enabled one or more user inputs 224 from user 100. At block 608, a preliminary instruction configured to cause one or more LED-based lighting units (e.g., 106a-d) to identify themselves, e.g., to smart phone 102, may be transmitted by smart phone 102 to one or more LED-based lighting units. At block 610, an instruction configured to cause one or more LED-based lighting units (e.g., 106a-d) to output light in a manner such that a predefined lighting effect is achieved, may be transmitted by smart phone 102 to one or more LED-based lighting units. This predefined lighting effect may in some embodiments serve as a baseline to which lighting property adjustments are applied.

At block 612, a local lighting effect may be sensed, e.g., by light sensor 246. At block 614, LED-based lighting units (e.g., 106a-d) that contribute to the sensed local lighting effect may be identified, e.g., by controller 220. Controller 220 may identify the contributing LED-based lighting units using various data, including but not limited to one or more lighting properties (e.g., hue, brightness, saturation, a coded light signal, etc.) of light emitted by one or more LED-based lighting units.

At block 616, an instruction configured to cause at least some of the contributing LED-based lighting units to implement the desired lighting property adjustment received at block 606 may be generated, e.g., by controller 220. At block 618, the instruction generated at block 616 may be wirelessly transmitted, e.g., by controller 220 using coded light, Wi-Fi, ZigBee, RFID, Bluetooth, etc., to one or more contributing LED-based lighting units.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified It should also be understood that, unless clearly indicated to the contrary, in any methods claimed herein that include more than one step or act, the order of the steps or acts of the method is not necessarily limited to the order in which the steps or acts of the method are recited. Also, reference numerals appearing between parentheses in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A mobile computing device, comprising:
   a light sensor;
   one or more user inputs; and
   a controller operably coupled with the light sensor and the one or more user inputs, and configured to:
   receive, via the one or more user inputs, input indicative of a desired lighting property adjustment for a lighting effect sensed by the light sensor;
   identify which of a plurality of LED-based lighting units contributes to the sensed lighting effect more than at least one other LED-based lighting unit, of the plurality of LED-based lighting units, that contributes to the sensed lighting effect; and
   generate, for wireless transmission to at least one of the plurality of the LED-based lighting units, an instruction configured to cause at least some of the plurality of LED-based lighting units to implement the desired lighting property adjustment.

2. The mobile computing device of claim 1, wherein the controller is configured to generate, for wireless transmission to one or more nearby LED-based lighting units in response to receipt of the input indicative of the desired lighting property adjustment, a preliminary instruction for the one or more nearby LED-based lighting units to transmit coded light signals to identify themselves to the mobile computing device.

3. The mobile computing device of claim 1, wherein the controller is configured to identify which of the plurality of LED-based lighting units contributes to the sensed lighting effect more than the at least one other LED-based lighting unit based on light output of the plurality of LED-based lighting units that is detected by the light sensor.

4. The mobile computing device of claim 1, further comprising at least one contextual sensor, wherein the controller is further configured to selectively enable the one or more user inputs to receive the input indicative of the desired lighting property adjustment based on a lighting context detected by the at least one contextual sensor.

5. The mobile computing device of claim 4, wherein the lighting context comprises a location of the mobile computing device, and the controller is configured to selectively enable the one or more user inputs based on a determination of whether the location is within a predefined area or within a predetermined distance of one or more contributing LED-based lighting units of the plurality of LED-based lighting units.

6. The mobile computing device of claim 5, wherein the at least one contextual sensor comprises a GPS unit, and the lighting context comprises coordinates provided by the GPS unit.

7. The mobile computing device of claim 5, wherein the at least one contextual sensor comprises a Wi-Fi interface, and the controller is configured to determine whether the location is within the predefined area or within the predetermined distance of the one or more contributing LED-based lighting units based on Wi-Fi fingerprinting.

8. The mobile computing device of claim 4, wherein the at least one contextual sensor comprises a Wi-Fi interface, and the lighting context comprises connection, by the mobile computing device via the Wi-Fi interface, with a Wi-Fi base station.

9. A mobile computing device, comprising:
   at least one contextual sensor;
   one or more user inputs; and
   a controller operably coupled with the at least one contextual sensor and the one or more user inputs, and configured to:
   selectively enable the one or more user inputs to receive input indicative of a desired lighting property adjustment for light output produced by one or more LED-based lighting units, based on a lighting context detected by the at least one contextual sensor; wherein the lighting context comprises a determination that the mobile computing device is in a hand of a user; and
   generate, for wireless transmission to the one or more LED-based lighting units in response to receipt at the one or more inputs of the desired lighting property adjustment, an instruction configured to cause at least some of the one or more LED-based lighting units to implement the desired lighting property adjustment.

10. The mobile computing device of claim 9, wherein the lighting context comprises a location of the mobile computing device, and the controller is configured to selectively enable the one or more user inputs based on a determination of whether the location is within a predefined area or within a predetermined distance of the one or more LED-based lighting units.

11. The mobile computing device of claim 10, wherein the at least one contextual sensor comprises a Wi-Fi interface, and the controller is configured to determine whether the location is within the predefined area or within the predetermined distance of the one or more LED-based lighting units based on Wi-Fi fingerprinting.

12. The mobile computing device of claim 9, wherein the lighting context comprises a sequence of contextual cues and the controller is configured to selectively enable one or more aspects of the one or more user inputs based on the detected sequence.

13. The mobile computing device of claim 9, wherein the at least one contextual sensor comprises a light sensor configured to sense a lighting effect, and the controller is configured to identify one or more LED-based lighting units that contribute to the sensed lighting effect based on light output of the one or more LED-based lighting units that is detected by the light sensor.

14. The mobile computing device of claim 13, wherein the controller is configured to generate, for wireless transmission to the one or more contributing LED-based lighting units, an instruction configured to cause at least some of the one or more contributing LED-based lighting units to implement a predetermined lighting effect.

15. A computer-implemented method for lighting control, implemented based at least in part on instructions stored in a non-transitory storage medium, comprising:

receiving, by a mobile computing device, input indicative of a desired lighting property adjustment for a lighting effect sensed by a light sensor of the mobile computing device;

identifying, by the mobile computing device, which of a plurality of LED-based lighting units contributes to the sensed lighting effect more than at least one other LED-based lighting unit, of the plurality of LED-based lighting units, that contributes to the sensed lighting effect; and generating, by the mobile computing device for wireless transmission to at least one of the plurality of LED-based lighting units, an instruction configured to cause at least some of the plurality of LED-based lighting units to implement the desired lighting property adjustment.

16. The method of claim 15, further comprising detecting, by at least one contextual sensor, a lighting context and selectively enabling one or more user inputs indicative of the desired lighting property adjustment based on the lighting context.

17. The method of claim 16, wherein the at least one contextual sensor comprises a GPS unit, and the lighting context comprises coordinates provided by the GPS unit.

18. The method of claim 16, wherein the lighting context comprises a determination that the mobile computing device is in a hand of a user.

* * * * *